US010602426B2

(12) United States Patent
Mui et al.

(10) Patent No.: US 10,602,426 B2
(45) Date of Patent: Mar. 24, 2020

(54) METHOD AND APPARATUS FOR MODIFYING A USER DATA PATH IN A WIRELESS COMMUNICATION NETWORK

(71) Applicant: Hong Kong Applied Science and Technology Research Institute Co., Ltd., Shatin, NT (HK)

(72) Inventors: Ka Ho Mui, Kowloon (HK); Yau Yau Yolanda Tsang, North Point (HK); Yee Simon Wong, Sheung Shui (HK)

(73) Assignee: Hong Kong Applied Science and Technology Research Institute Co. Ltd., Shatin (HK)

( * ) Notice: Subject to any disclaimer, the term of this patent is extended or adjusted under 35 U.S.C. 154(b) by 30 days.

(21) Appl. No.: 15/992,360

(22) Filed: May 30, 2018

(65) Prior Publication Data

US 2019/0373531 A1  Dec. 5, 2019

(51) Int. Cl.
*H04W 40/36* (2009.01)
*H04W 36/00* (2009.01)

(52) U.S. Cl.
CPC ....... *H04W 40/36* (2013.01); *H04W 36/0033* (2013.01)

(58) Field of Classification Search
CPC ............. H04W 76/028; H04W 76/046; H04W 28/0268; H04W 36/023; H04W 12/04;
(Continued)

(56) References Cited

U.S. PATENT DOCUMENTS

2015/0208291 A1  7/2015 Lee et al.
2015/0334767 A1* 11/2015 Chien .................. H04W 24/08
370/217
(Continued)

FOREIGN PATENT DOCUMENTS

CN  WO2014019554 A1  2/2014
WO  2016051236 A1  4/2016

OTHER PUBLICATIONS

International Search Report and Written Opinion: PCT/CN2018/089759; dated Feb. 28, 2019.

*Primary Examiner* — Jung Liu (57) ABSTRACT

Provided is a method of modifying a data path between a user equipment (UE) and a core network node (CNN) in a wireless communication network. The method comprises the steps of: at a network node handling both signalling messages and user data for an existing data path between said UE and said CNN, obtaining data uniquely associated with a data path resource for said UE and/or uniquely identifying said UE and mapping said data to said existing data path; and modifying said existing data path based on said mapping. The network node handling both signal messaging and user data for an existing data path may comprise a gateway (GW) connecting a source base station (SBS) and a target base station (TBS) to a Mobility Management Entity (MME) of the core network, said GW being configured to handle both user plane data and control plane data for a plurality of UEs. The data uniquely associated with a data path resource for said UE and/or uniquely identifying said UE may be obtained from a Source to Target Transparent Container Information Element (IE) of a Handover Required message issued by the SBS.

17 Claims, 8 Drawing Sheets

(58) Field of Classification Search
CPC ..... H04W 12/10; H04W 12/06; H04W 76/27;
H04W 76/19; H04W 36/04; H04W
36/0016; H04W 36/0061; H04W 36/32;
H04W 76/025; H04W 76/15; H04L
1/0018; H04L 63/123; H04L 45/16
See application file for complete search history.

(56) References Cited

U.S. PATENT DOCUMENTS

| | | |
|---|---|---|
| 2016/0044559 A1 | 2/2016 | Xu et al. |
| 2016/0353511 A1* | 12/2016 | Gunnarsson ........ H04W 36/023 |
| 2017/0353890 A1* | 12/2017 | Wang .................... H04L 41/046 |
| 2017/0353896 A1 | 12/2017 | Nath et al. |

* cited by examiner

METHOD AND APPARATUS FOR MODIFYING A USER DATA PATH IN A WIRELESS COMMUNICATION NETWORK

FIELD OF THE INVENTION

The invention relates to a method and apparatus for modifying a user data path between a user equipment (UE) and a core network node (CNN) in a wireless communication system and, more particularly, to a method of more efficiently managing data path resources when switching between a gateway and base-stations in a mobile communication environment.

BACKGROUND OF THE INVENTION

Wireless communication networks such as Fourth Generation (4G, also referred to as Long Term Evolution (LTE)) networks are presently widely deployed to provide various telecommunication services such as telephony, video, data, messaging, and broadcasts. However, whilst current 4G technology offers much faster data rates than its previous generations, it has limitations due to its bandwidth, scalability and number of users under individual cells.

The new radio (NR) standard for 5G networks has been developed and is being rolled out to provide new functionalities including enabling the connection of many things in, for example, the Internet of Things (IoT) with low latency and very greatly increased speeds. NR builds upon today's LTE networks, expanding and improving existing coverage with the goal to facilitate enhanced mobile broadband by using 5G small cells to boost the data rates on an LTE anchor network. Consequently, the 5G Radio Access architecture is composed of LTE Evolution and an NR Access Technology operable from about 1 GHz to about 100 GHz.

The telecommunications system is therefore moving towards a flatter architecture where macro and metro cells are directly, or indirectly, connected through one or more gateway (GW) nodes or devices to the core network. The GW nodes act as signal and data path aggregators. An increase of user subscription also contributes to the increase in the amount of network signaling. Analysis has shown that a network core entity, such as the Evolved Packet Core (EPC) Mobility Management Entity (MME) may experience a sustained signaling load of over 500-800 messages per user equipment (UE) during normal peak busy hours and up to 1500 message per UE per hour under heavy usage conditions. In modern systems, it is therefore common to densely deploy many small cells to improve coverage which inherently involves much more frequent handovers taking place between base stations.

The S1 Application Protocol (S1AP) is a signaling protocol between the base stations, e.g. Evolved NodeB (eNodeB), and the core network, e.g. the EPC. The S1AP protocol carries control signaling between an eNodeB and the MME on an S1-MME interface. The S1AP protocol carries upper layer Non Access Stratum (NAS) messages for the EPC and the UEs and manages data paths between base stations and the core network. When a large number of base stations need to connect to the core network, a GW node may be used as an aggregator of the connections from these base stations such that a high amount of signaling messages are required to be handled by the GW node.

A number of technical problems arise in the presence of the GW node(s), including that a user data path creation process between a UE and a core network node cannot directly or explicitly identify a previously created user data path between said UE and a core network node. The S1AP protocol does not link or does not provide information linking these two processes, because the use data path creation process and the user data path removal process may be implemented in different GW nodes and, even if both are implemented by a same GW node, the processes are by their nature independent of each other, namely one removes a previously created user data path and the other independently creates a new user data path. For handover of a UE from one base station to another, there is no technical requirement for the new data path creation process to be linked, i.e. have knowledge of, the data path removal process even when the two processes are implemented in the same GW node for a specified UE. Also, a GW node operating the S1AP protocol has no access to the permanent UE ID, e.g. the unique international mobile subscriber identity (IMSI), which is found in the NAS layer. The absence of a common ID or the like to link a UE connection resource to an existing user data path for said UE prevents a GW node handling handover of the UE from a source base station (SBS) to a target base station (TBS) from reusing the already existing user data path.

WO2014019554 discloses that a bearer path can be optimized following a mobile relay node (MRN) handover in order to directly re-route the bearer path from a UE core network to a target donor base station (De NB). Bearer path optimization signaling includes a packet data network gateway (PGW) relocation information element (IE) indicating that a PGW of an MRN is being relocated from an initial De NB to a target De NB. The PGW relocation IE may be carried in a path switch request message. Bearer path optimization signaling also includes an NAS activate default enhanced packet switch (EPS) bearer context request/accept messages for activating the optimized bearer path. The NAS activate default EPS bearer request/accept messages may be communicated between the mobile relay node MME and the MRN via the target De NB.

US20150208291 discloses a communication method of an MME supporting inter-gateway handover of a terminal includes acquiring, when a handover from a source gateway to a target gateway is detected during an ongoing data communication of the terminal, information on a session between the terminal and a server and transmitting, when the server is a local server present in a mobile communication core network, a tunnel setup command to the local server through an interface established with the local server, the tunnel setup command instructing to establish a tunnel between the local server and the target gateway for data communication from the local server to the target gateway.

US20160044559 discloses a method and apparatus for transmitting a Handover Request message in a wireless communication system. For service differentiation from a small cell and a macro cell, a first macro eNB transmits a Handover Request message including a list of first services for a UE, which are provided by the first macro eNB, and a list of second services for the UE, which are provided by a small cell eNB which has dual connectivity with the first macro eNB.

None of WO201401955, US20150208291 and US20160044559 makes use of the fact that, where a same GW node handles the existing user data path removal process and the new user data path creation process, all of the information that could be used for modifying and re-using an existing user data path passes through said GW node even though such information is not linked together.

In light of the above, there is a need to better manage path resources between a GW node and base stations in a mobile wireless communication network to reduce overhead and improve efficiency of mobile communications.

OBJECTS OF THE INVENTION

An object of the invention is to mitigate or obviate to some degree one or more problems associated with implementation of the S1AP protocol in GW nodes.

The above object is met by the combination of features of the main claims; the sub-claims disclose further advantageous embodiments of the invention.

Another object of the invention is to mitigate or obviate to some degree one or more problems associated with the handover procedure between base stations in known mobile communication systems.

Another object of the invention is to mitigate or obviate to some degree one or more problems associated with the handover procedure between base stations in known mobile communication systems using an aggregating GW node.

One skilled in the art will derive from the following description other objects of the invention. Therefore, the foregoing statements of object are not exhaustive and serve merely to illustrate some of the many objects of the present invention.

SUMMARY OF THE INVENTION

In a first aspect, the invention provides a method of modifying a data path between a user equipment (UE) and a core network node (CNN) in a wireless communication network. The method comprises the steps of: at a network node handling both signaling messages and user data for an existing data path between said UE and said CNN, obtaining data uniquely associated with a data path resource for said UE; mapping said data to said existing data path; and modifying said existing data path based on said mapping.

The network node handling both signal messaging and user data for an existing data path may comprise a gateway (GW) connecting a source base station (SBS) and a target base station (TBS) to a Mobility Management Entity (MME) of the core network, said GW being configured to handle both user plane data and control plane data for a plurality of UEs. The data uniquely associated with a data path resource for said UE said UE may be obtained from a Source to Target Transparent Container IE of a Handover Required message issued by the SBS.

In a second aspect, the invention provides a node for a wireless communication network. The node comprises a non-transitory computer readable medium storing machine executable instructions and a processor connected to the non-transitory computer readable medium configured to execute the machine executable instructions. The processor arranges the node to: handle both signaling messages and user data for an existing data path between a user equipment (UE) and a core network node (CNN); obtain data uniquely associated with a data path resource for said UE and/or uniquely identifying said UE; map said data to said existing data path; and subsequently modify said existing data path based on said mapping.

In a third aspect, the invention provides a non-transitory computer readable medium storing machine executable instructions, which, when such instructions are executed by a processor, configure the processor to implement the steps of the methods of the first aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
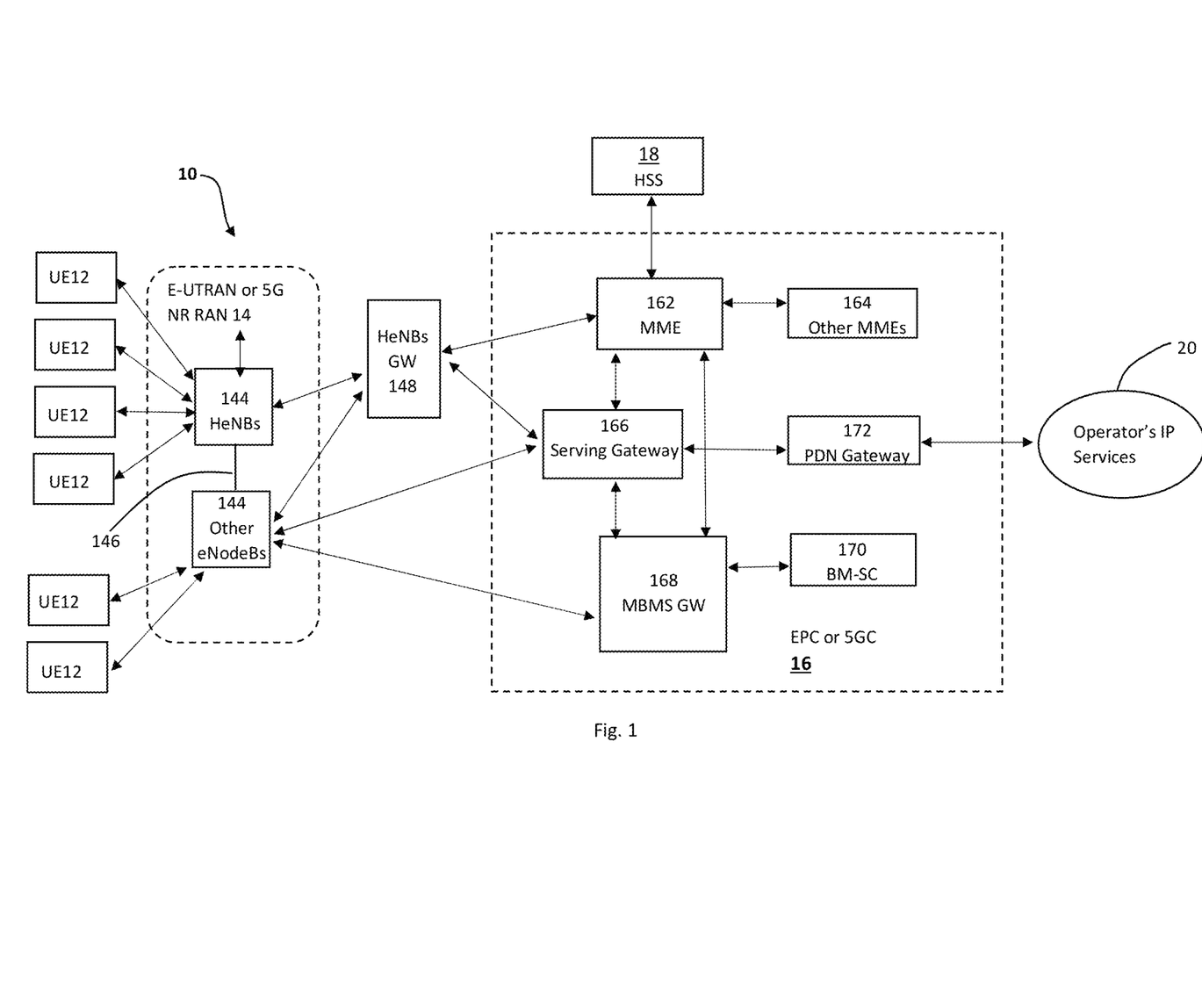
FIG. 1 is a diagram illustrating, by way of example only, a network architecture for embodiments of the present application.

FIG. 1 is a diagram illustrating, merely by way of example only, an LTE network architecture 10 in which the methods of the present application can be performed, but it will be understood by one skilled in the art that the methods may be performed in other network architectures, including an LTE network modified to operate the 5G NR standard or interoperate with a 5G Next Generation Core (5GC) network. It will further be understood that, as 5GC networks fully develop and are implemented, the methods of the invention described herein can be performed wholly within such networks.

The LTE network architecture 10 of FIG. 1 may be referred to as an Evolved Packet System (EPS) 10. The EPS 10 may include one or more user equipment (UE) 12, an Evolved UMTS Terrestrial Radio Access Network (E-UTRAN) 14, an Evolved Packet Core (EPC) 16, a Home Subscriber Server (HSS) 18, and an Operator's Internet Protocol (IP) Services 20. The EPC 16 can interconnect with other access networks, but for simplicity those entities/interfaces are not shown.

The EPC 16 may be replaced by a 5GC network which may have a different physical configuration to that of the EPC 16 shown in FIG. 1, but the methods of the invention will be able to be implemented by the 5GC network. Therefore, in the following description reference will be made to only the EPC 16 by way of illustrating the steps of the methods of the invention.

The E-UTRAN 14 comprises the radio access network (RAN) and this may be replaced by a 5G NR RAN, but the methods of the invention will be able to be implemented by the 5G NR RAN. Therefore, in the following description reference will be made to the E-UTRAN 14 by way of illustrating the steps of the methods of the invention.

The E-UTRAN 14 includes a plurality of Home eNodeBs (HeNBs) 142 and other eNBs 144. Only one HeNB 142 is shown for reasons of clarity in the drawing. The HeNBs 142 provide user and control plane protocol terminations toward the UEs 12. A plurality of UEs 12 are connected to the HeNBs 142, although only a small number of UEs are shown for reasons of clarify in the drawing. The HeNBs 142 may be connected to other HeNBs and to eNBs 144 via a backhaul (e.g., an X2 interface) 146. Each HeNB 142 provides an access point to the EPC 16 for a plurality of UEs 12 via one or more HeNB GW nodes 148, although only one is shown. Each HeNB GW node 148 aggregates user plane data and control plane data for a plurality of HeNBs 142. An HeNB 142 performs the same functions as a standard eNB 144, but is optimized for coverage in much smaller areas than macro eNBs.

Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device including any IoT compatible devices or the like. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The EPC 16 may include a Mobility Management Entity (MME) 162, other MMEs 164, a Serving Gateway (SGW) 166, a Multimedia Broadcast Multicast Service (MBMS) Gateway 168, a Broadcast Multicast Service Center (BM-SC) 170, and a Packet Data Network (PDN) Gateway 172. The MME 162 is the control node that processes the signaling between the UE 12 and the EPC 16. Generally, the MME 162 provides bearer and connection management. All user IP packets for eNBs 144 are transferred through the SGW 166 which itself is connected to the PDN Gateway 172, but user packets for the HeNBs 142 are transferred through the HeNB GW node 148. The network preferably has a plurality of HeNB GW nodes 148 for serving the HeNBs 142 and the UEs 12.

Figure 2:
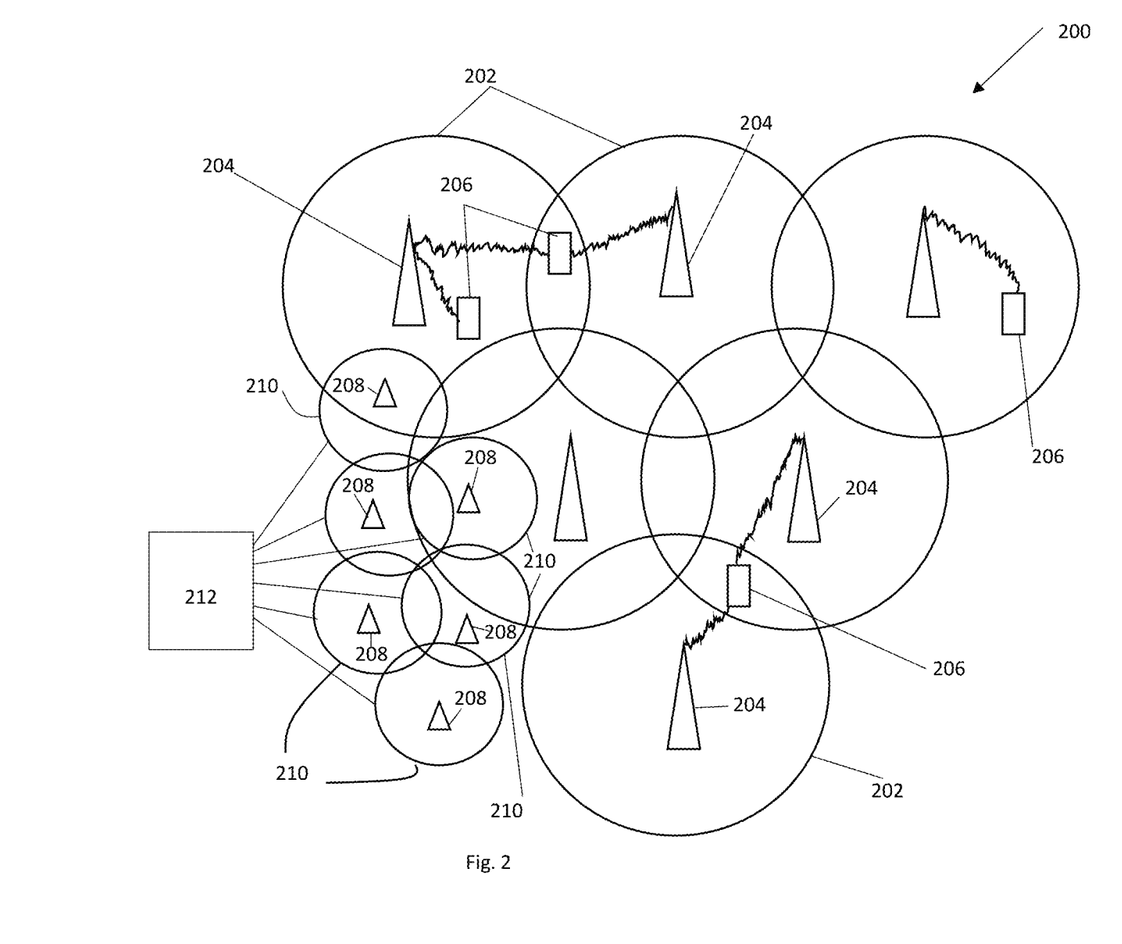
FIG. 2 is a diagram illustrating, by way of example only, an access network for embodiments of the present application.

FIG. 2 is a diagram illustrating an example of an access network 200 in an LTE network architecture such as that described with respect to FIG. 1. Again, it will be understood that an access network for a 5GC network may have a different physical configuration to the access network 200 of FIG. 2, but reference here to the access network 200 should be taken as a reference to a 5GC access network. In this example, the access network 200 is divided into a number of large or macro cellular regions (cells) 202. The eNBs 204 may be configured to provide radio related functions including radio bearer control, admission control, mobility control, scheduling, security, and connectivity to the SGW 166. An eNB may support one or multiple cells (also referred to as a sector). The term "cell" can refer to the smallest coverage area of an eNB and/or an eNB subsystem serving a particular coverage area. It will be understood, however, that the network 200 may include a plurality of HeNBs 208, each associated with a respective small coverage area such as a 'small cell' or a femtocell 210. Signaling messages and user data from the HeNBs 208 will be aggregated by one or more HeNB GW nodes 212.

The modulation and multiple access scheme employed by the access network 200 may vary depending on the particular telecommunications standard being deployed. In LTE applications, OFDM is preferably used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system, but extend also to the 3GPP Technical Specification Group Radio Access Network, NR, Physical layer procedures for data (Release 15).

Figure 3:
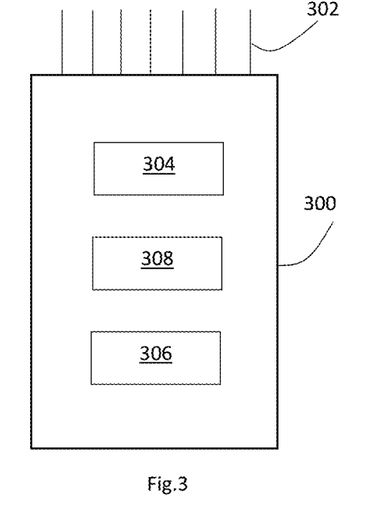
FIG. 3 illustrates a HeNB for embodiments of the invention.

FIG. 3 illustrates a basic structure of a HeNB 300 for implementing the methods of the invention. The HeNB 300 may include multiple antenna elements 302 or even a massive number of antenna elements 302 (only a small number of antenna elements are shown for clarity of the drawing) although this is not essential, a communications module 304 for communicating wirelessly with a UE and communicating with other components of a wireless communication system such as a HeNB GW node (not shown). The HeNB 300 is also provided with a non-transitory memory 306 storing machine readable instructions for execution by a processor 308. When executing the machine instructions, the processor 308 configures the HeNB 300 to implement the methods of the invention. An eNB would have a similar structure as described above for the HeNB.

Figure 4:
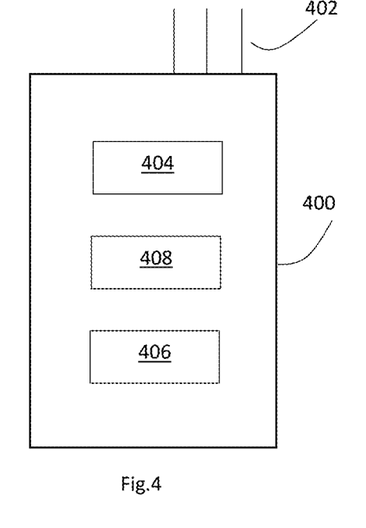
FIG. 4 illustrates a UE for embodiments of the invention.

FIG. 4 illustrates a basic structure of a UE 400 for implementing the methods of the invention. The UE 400 comprises at least one antenna 402, but may include multiple antennas 402 or even a massive number of 100 or more antenna elements 402. It is also provided with a communications module 404 for communicating wirelessly with one or more BSs such as one or more HeNBs and one or more eNBs. The UE 400 also has a non-transitory memory 406 storing machine readable instructions for execution by a processor 408. When executing the machine instructions, the processor 408 configures the UE 400 to implement the methods of the invention.

Figure 5:
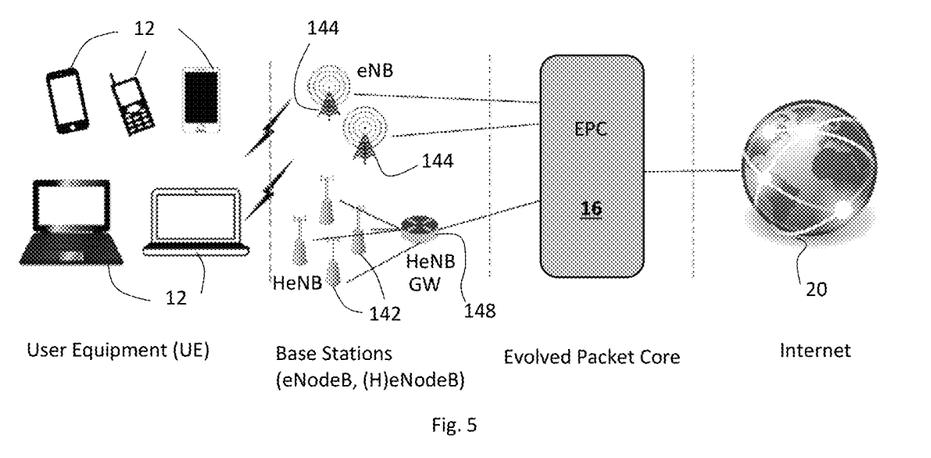
FIG. 5 is an illustration of a typical network environment.

FIG. 5 illustrates a typical network scenario where UEs 12 connect to the core network, e.g. the EPC or 5GC 16 via one or more eNBs 144 and/or via one or more HeNBs 142. The HeNBs 142 are themselves connected to the EPC 16 via one or more HeNB GW nodes 148. The EPC 16 provides access to other networks such as the internet, e.g. an Operator's Internet Protocol (IP) Services 20.

Figure 6:
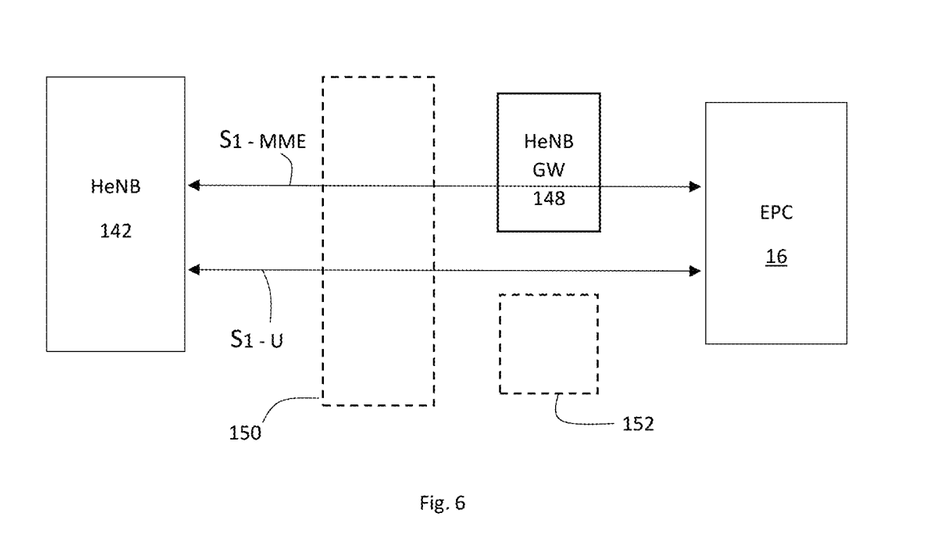
FIG. 6 illustrates the S1 interfaces for a HeNB.

FIG. 6 shows how the E-UTRAN or 5G NR RAN may deploy a HeNB GW node 148 to provide the S1AP S1 interface between the HeNB 148 and the EPC 16 to scale to support a large number of HeNBs 142. The HeNB GW node 148 serves as a concentrator for the control plane (C-plane), specifically the S1-MME interface. The S1-U interface from the HeNB 142 may be terminated at the HeNB GW node 148 in some situations. The network architecture may be such as to optionally include a HeNB security gateway (SeGW) 150 and a HeNB management system 152.

Figure 7:
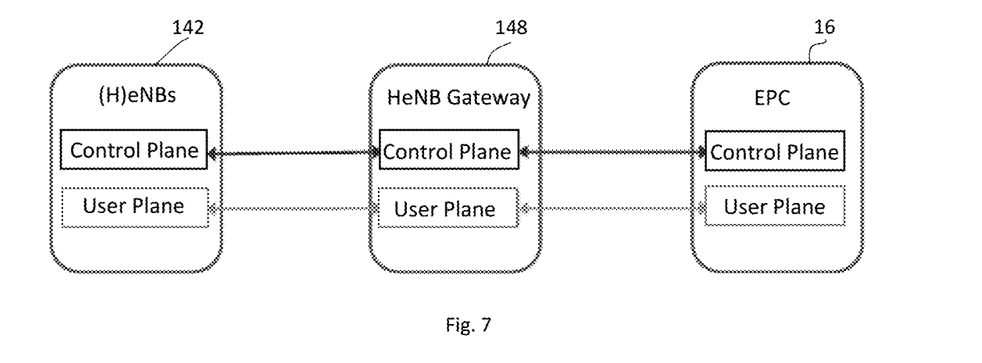
FIG. 7 illustrates the independence of the user plane and the control plane across a network environment.
Figure 8:
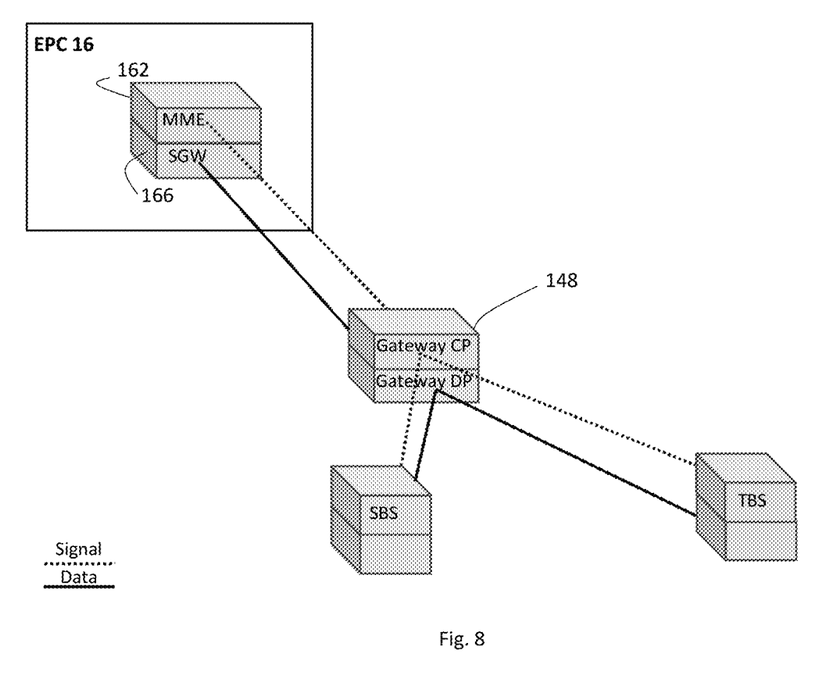
FIG. 8 further illustrates the independence of the user plane and the control plane across a network environment.

FIG. 7 illustrates the separation of the user plane (U-plane) or data plane (D-plane) from the C-plane. The terms U-plane and D-plane are used interchangeably herein as each comprises the same thing. It can be seen from FIG. 7 that each of the HeNBs 142, the HeNB GW nodes 148 and the EPC 16 handle both D-plane and C-plane as separate, independent processes. This is also illustrated by FIG. 8 where the base stations SBS and TBS each connect through the GW node 148 to the EPC 16. However, FIG. 8 further illustrates that in the EPC 16 the D-plane is handled by the SGW 166 whereas the C-plane is handled by the MME 162. It will be noted that the SGW 166 and MME 162 comprise different entities within the EPC 16 and, as such, not only are the D-plane and C-plane logically independent, but are physically separated to different network nodes/entities 162, 166.

Figure 9:
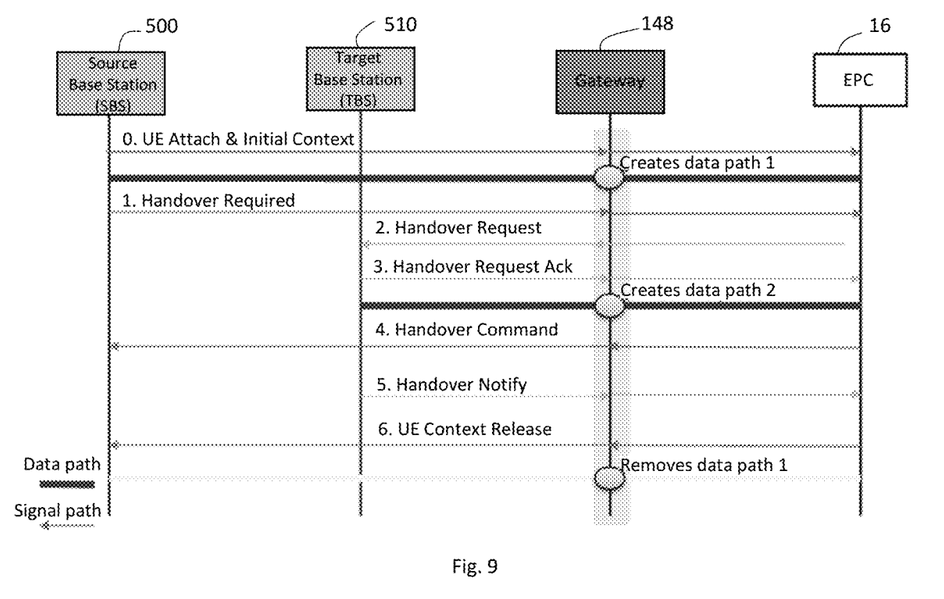
FIG. 9 illustrates a conventional handover procedure in a wireless communication network.

FIG. 9 illustrates a conventional handover process between a SBS 500 and a TBS 510 where an existing user data path Cold data path) has previously been established between the SBS 500 and a core network node in the EPC 16 or another node in a network such as the internet 20 by means of a 'UE attach and initial context setup' process (0) in a known manner. When a handover from SBS 500 is required, SBS 500 issues an initiation request such as a 'Handover Required' message (1) which is transmitted to the GW node 148 and EPC 16. In response, a 'Handover Request' message (2) is transmitted to the TBS 510. The TBS 510 issues a 'Hanover Request Acknowledged' message (3) and, in response thereto, a new data path is created connecting to the TBS 510. A 'Handover Command' message (4) is communicated to the SBS 500 whilst a 'Handover Notify' message (5) is issued by the TBS 510. In response, a 'UE Context Release' message (6) is communicated to the SBS 500 leading to the removal of the previously established user data path. Consequently, the removal of the old data path and the creation of the new data path are independent processes and may even be carried out by different GW nodes 148. There is no requirement to link said path creation and path removal processes and information is not shared between the two processes.

Figure 10:
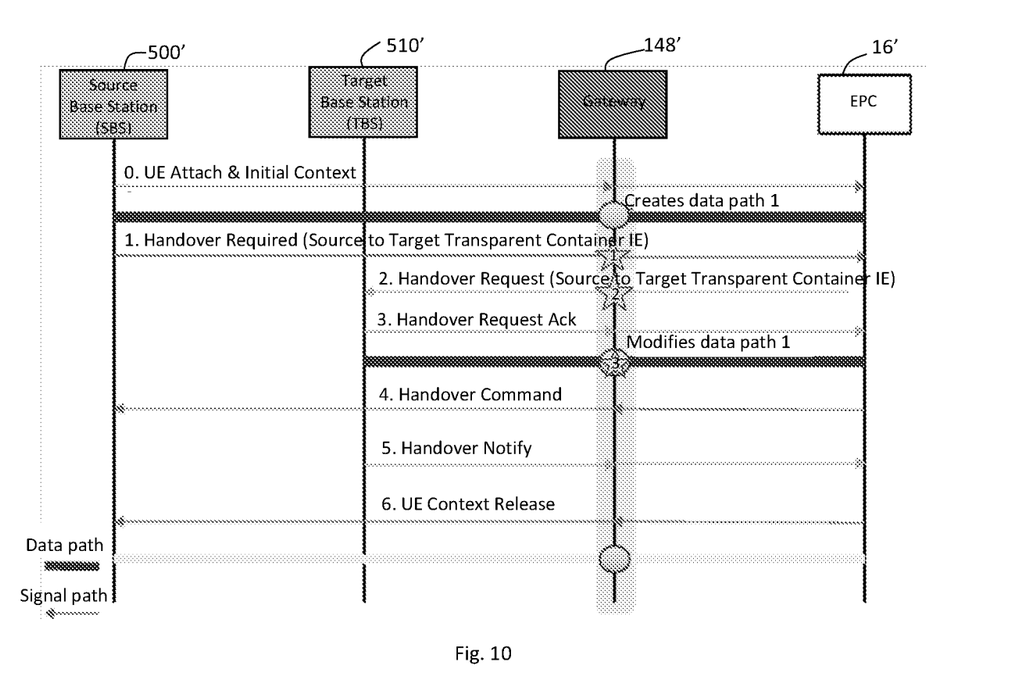
FIG. 10 illustrates a modifies handover procedure in accordance with the invention.

In contrast to the foregoing, FIG. 10 illustrates a modified handover process in accordance with the invention which leads to modification and re-use of an existing user data path.

It is important to note here that the method of the present invention applies only when the same GW node 148' handles both D-plane and C-plane processes for a handover procedure, namely that the handover is an intra-gateway handover rather than an inter-gateway handover. Although this amounts to a limitation in the implementation of the method in accordance with the present invention, it should be understood that, in network architectures employing small sized cells such as femtocells, most handovers comprise intra-gateway handover events. The modified handover method described herein reduces computer processing unit (CPU) use and reduces load on random access memory (RAM) in at least the GW node 148'.

Whilst the description of the modified method according to the method hereinafter provided makes reference to the HeNB connected to the GW node, it will be understood that the modified method could be implemented by any network node through which both D-plane and C-plane data passes during implementation of a handover procedure.

In FIG. 10, an existing user data path has previously been established between a UE via the SBS 500' to a core network node in the EPC 16' or another node in a network such as the internet 20' by means of a 'UE attach and initial context setup' process (0) in a known manner. When a handover from SBS 500' to TBS 510' is required, SBS 500' issues a 'Handover Required' message (1) again in a known manner which is transmitted to the GW node 148' and EPC 16'. On receiving the 'Handover Required' message (1), the GW node 148 examines the message and obtains from it data uniquely associated with the data path resource for said UE and/or uniquely identifying said UE. The GW node 148' is configured to map said obtained data to the existing data path ('data path 1') thereby making a connection between the signaling data, i.e. C-plane date, and the user data, i.e. D-plane data. This mapping enables the GW node 148' to subsequently modify the existing data path to connect to TBS 510'. The GW 148' may store the mapping in a look-up table or in any manner which allows the mapped data to be accessed.

The data uniquely identifying the data path resource for said UE preferably comprises a parameter such as information element (IE) data obtained by said GW node 148' from said 'Handover Required' message (1). The data preferably comprises IE data obtained from a Source to Target Transparent Container IE of said 'Handover Required' message (1). The Source to Target Transparent Container IE is an information element that is used to transparently pass radio related information from the handover source (SBS 500') to the handover target (TBS 510') through the EPC 16'. When the target network is E-UTRAN, the container carries Source to Target Transparent Container IE defined in 3GPP TS 36.413. The transparent container field contains a transparent copy of the corresponding ASN.1/PER IE.

Figure 11:
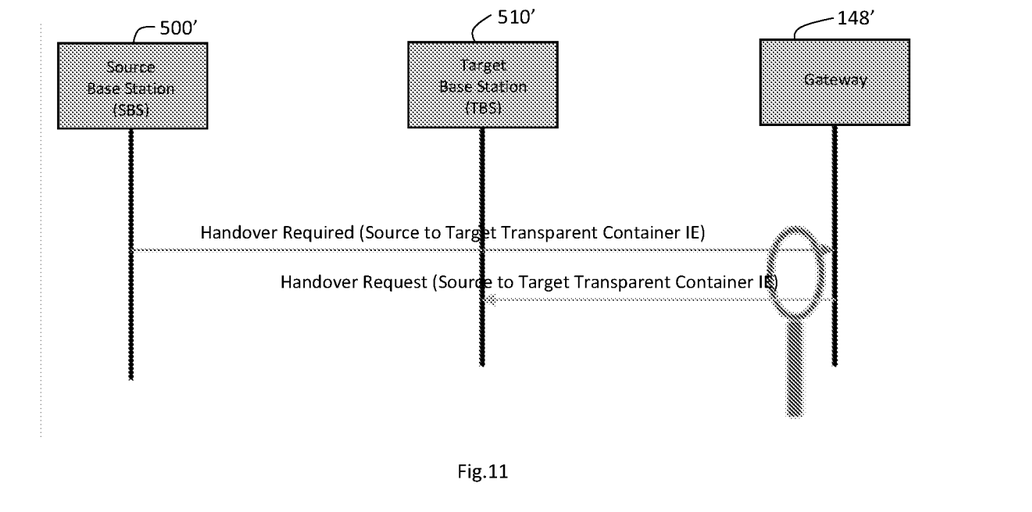
FIG. 11 illustrates the commonality of the Source to Target Transparent Container IE to both the 'Handover Required' message and the 'Handover Request' message in a handover procedure in a wireless communication network.

Referring to FIG. 11, it can be seen that the Source to Target Transparent Container IE contained in the 'Handover Required' message is replicated in the 'Handover Request' message. As such, the data is unaltered when it is received by the EPC 16' and when it is placed into the 'Handover Request' message. As such, the Source to Target Transparent Container IE container parameter comprising, for example, some IE data can be used through the mapping mechanism to link the user data path and handover event for a specific UE such that the user data path can be modified and transferred to the TBS 510' rather than requiring the creation of a new data path and the removal of the existing data path.

Figure 12:
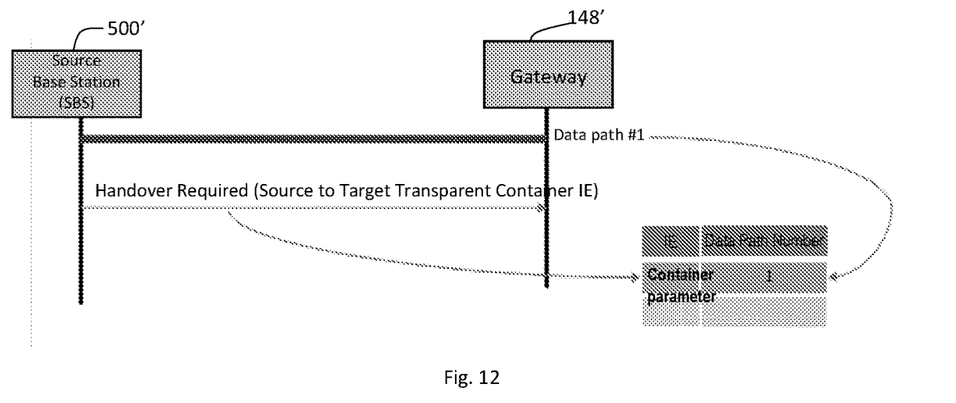
FIG. 12 illustrates the mapping of IE data to an existing user data path in the modified handover procedure in accordance with the invention.

FIG. 12 shows the mapping of the container parameter which may comprise a buffer stream to the existing data path ('data path number 1') performed by the GW node 148'. The mapping is preferably stored by the GW node 148'. The GW node 148' identifies the UEs associated with the S1AP messages it receives by locating the corresponding Source to Target Transparent Container IEs in the S1AP 'Handover Required' messages sent from the SBSs during handovers and mapping these to existing data path resources.

Referring again to FIG. 10, once the 'Handover Required' message (1) has been communicated to the GW node 148' and the EPC 16', a 'Handover Request' message (2) again in known manner is communicated to the TBS 510'. As indicated, the 'Handover Request' message (2) carries the unaltered Source to Target Transparent Container IE. The GW node 148' on receiving the 'Handover Request' message (2) examines the message to again access the data uniquely associated with the data path resource for said UE preferably comprising the Source to Target Transparent Container IE container parameter data previously obtained by said GW node 148' from said 'Handover Required' message (1). The GW node 148' therefore obtains the container parameter data from the Source to Target Transparent Container IEs in the S1AP Handover Request messages (2) sent to the TBSs, as the key to the previous resources and may use this data to re-use established tunnels (data paths).

Figure 13:
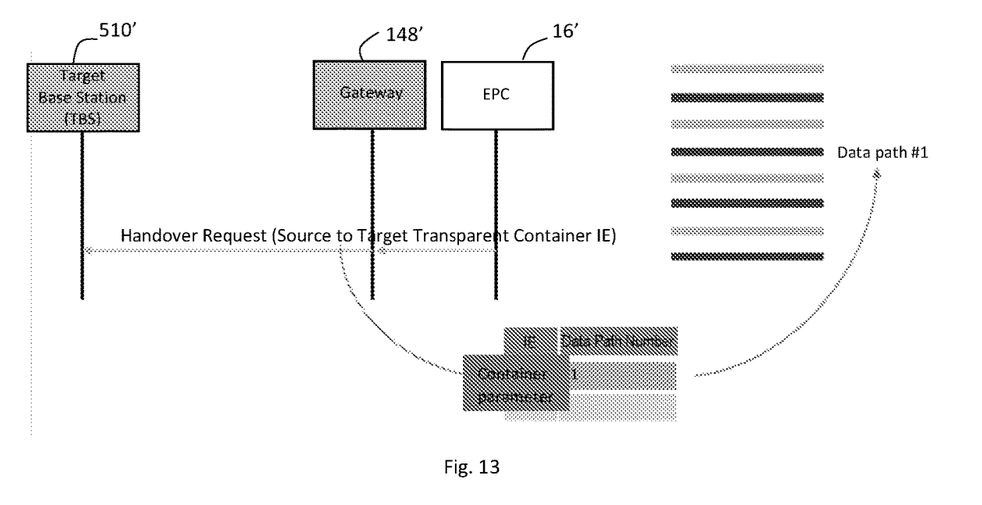
FIG. 13 illustrates the identification of an old user data path to be re-used in the modified handover procedure in accordance with the invention.

The GW node 148' determines if said newly obtained container parameter data matches with already stored data in, for example, said look-up table. If a match is found, the GW node 148' can retrieve the previously mapped existing data path set-up information and use this data to transfer the existing data path to the TBS 510' as illustrated in FIG. 13, i.e. to communicate the path set-up information to the TBS 510' to enable it to re-use the existing path. Consequently, the modified handover process negates the need to create a new data path and to tear down, i.e. remove, the existing data path.

The container parameter data preferably comprises a radio network temporary identifier (RNTI) associated with said UE and, more particularly, a cell-RNTI (C-RNTI). The C-RNTI provides a unique UE identification at the cell level identifying the Radio Resource Channel (RRC) connection. Each RRC connection is associated with the C-RNTI. Conventionally, the HeNB/eNB (SBS 500') assigns the UE a C-RNTI to identify the UE during exchange of all information over the air. The C-RNTI is assigned during the setup of the RRC connection between a UE and a HeNB/eNB and is valid only for that RRC Connection. Once the UE leaves the coverage area of a HeNB/eNB the RRC connection must be moved and the "new" HeNB/eNB (TBS 510') will assign a "new" C-RNTI to the UE. The C-RNTI is an E-UTRAN specific identifier and the EPC 16' has no visibility to it. The C-RNTI is therefore a unique identification used for identifying RRC Connection and scheduling which is dedicated to a particular UE. However, in the method of the present invention, it is recognized that, where a handover is being handled intra-gateway, the GW node 148' can use the mapping of the container parameter data such as the C-RNTI to the existing data path to re-use said data path on handover, because the C-RNTI is unaltered between the 'Handover Required' message and the 'Handover Request' message for a specific UE.

The method of extracting container parameter data from a Source to Target Transparent Container IE from a signaling message may comprise firstly recording the C-RNTI in the Source to Target Transparent Container IE for data path 1, then looking up the C-RNTI in the Source to Target Transparent container IE, creating a mapping of the recorded C-RNTI to the data path 1 and, subsequently, modifying data path 1 instead of creating data path 2. C-RNTI is unique for each UE and is unaltered in the 'Handover Required' and 'Handover Request' messages for a specified UE. The C-RNTI data relates the two signaling messages, but does not directly provide information about the specified UE.

Figure 14:
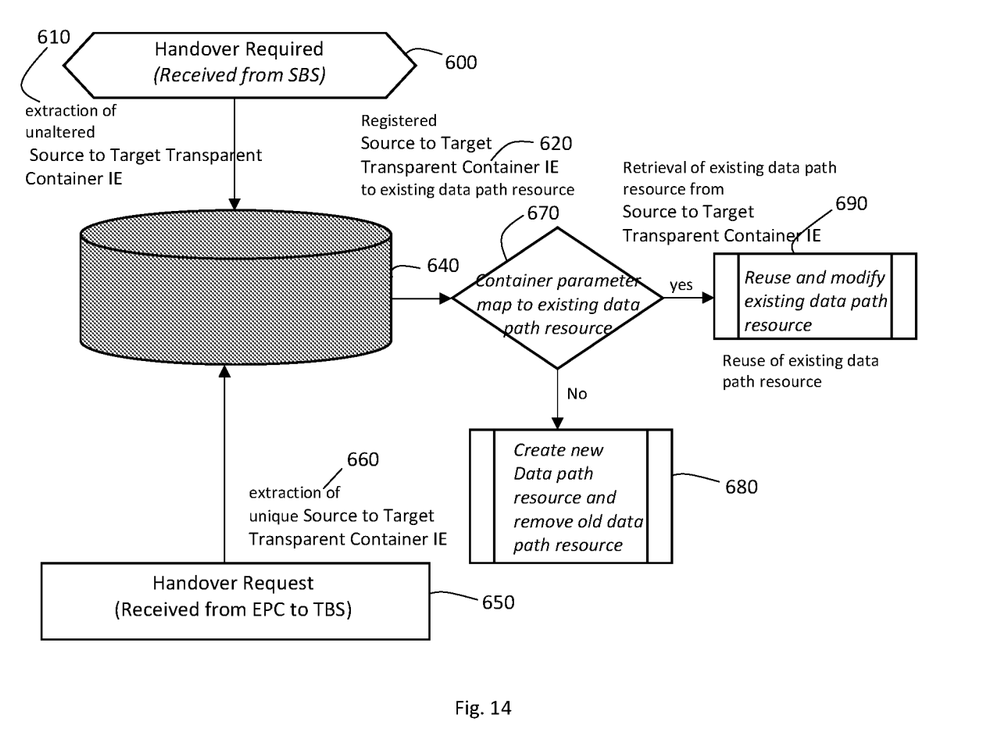
FIG. 14 provides a flow diagram of the modified handover procedure in accordance with the invention.

FIG. 14 is a flow chart of the method in accordance with the invention. An existing user data path has previously been established between a UE via the SBS to a core network node in the EPC or another node in another core network such as the internet by means of a 'UE attach and initial context setup' process in a known manner. In a first step 600 of the method, a 'Handover Required' message is issued by the SBS and is received at the GW node. The 'Handover Required' message has a conventional format, i.e. it is not modified for the method of the invention. In a second step 610, the GW node extracts the unaltered Source to Target Transparent Container IE from the 'Handover Required' message and, in a third step 620, registers the Source to Target Transparent Container IE with a UE temporary ID which links to the existing data path resource for a specific UE. In a fourth step 640, the GW node stores the registration or mapping of container parameter data from the Source to Target Transparent Container IE of the 'Handover Required' message with the UE temporary ID in a memory or a database such as in a look-up table or the like. It is not essential that the registered or mapped data is stored in the GW node, but this is preferred for ease of accessibility. In a fifth step 650, a 'Handover Request' is issued to the TBS. When this request is received by the GW node, it, in a sixth step 660, extracts the unique Source to Target Transparent Container IE from the 'Handover Request' message and, in a seventh step 670, determines whether or not extracted container parameter data from Source to Target Transparent Container IE from from the 'Handover Request' message matches the data already mapped to an existing or an old path resource. In the event that there is no match, a new data path resource is created for the TBS and the old data path resource removed in a step 680. In the event that there is a match, in a step 690, the GW node is able to modify the existing data path resource and reassign it to the TBS. The GW node provides data path resource setup information for the specific UE to the TBS which enables the data path resource to be established from the specified UE to a core network node through the TBS and, in effect, remove the path from the SBS without the need to create a new data path resource and tear down the old data path.

Figure 15:
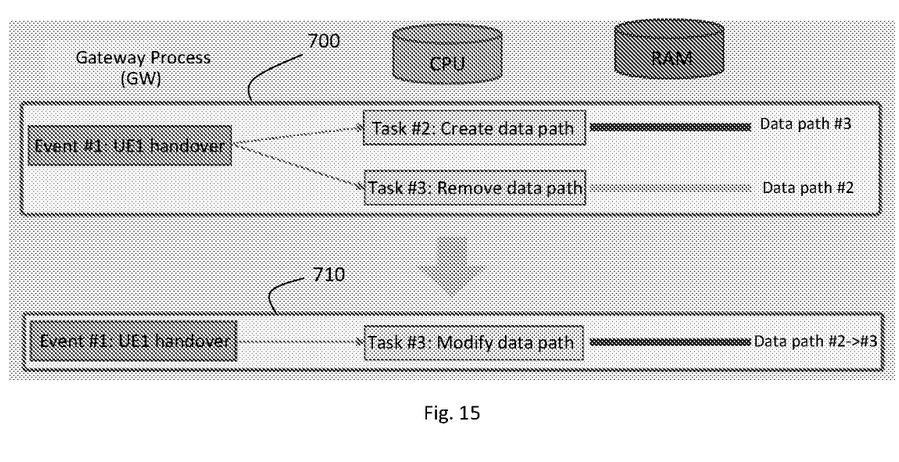
FIG. 15 provides a comparison of computing and memory resources required for a convention handover procedure and the modified handover procedure in accordance with the invention.

FIG. 15 illustrates at 700 the conventional handover procedure where a new path is created and an old path is torn down and contrasts this at 710 with the modified method according to the invention where the old path is re-used. It can be seen that the modified method of the invention requires less CPU and RAM resources than the conventional method. This is particularly advantageous bearing in mind that a GW node will be processing thousands of handover processes per hour.

The GW node of the present invention can be considered as comprising a signaling gateway in a mobile network which contains base station nodes connecting to core network nodes through the signaling gateway node, where the base station nodes provide access to the communication network for mobile devices (UEs). The GW node of the invention is modified to provide an intra-gateway S1 handover system comprising in effect:

(i) a signaling gateway component that interprets and forwards S1AP signaling messages between base stations nodes and core network nodes;

(ii) a data path resource mapping mechanism to identify reusable data path resources for a mobile device involved in a handover transaction by interpreting S1AP signal information and its mapping IE data to corresponding data path resources; and (iii) a data path resource management mechanism to reduce S1 handover switching time by reusing existing data path resources to achieve the data transfer requirement of mobile the device with target base station during S1 handover.

The modified handover method of the present invention generally comprises:

(1) Receiving a 'Handover Required' message from the SBS and extracting the unaltered unique Source to Target Transparent Container IE;

(2) Registering/mapping the unique Source to Target Transparent Container IE with the UE temporary ID which links to the data path resource for said UE thereby registering the unique Source to Target Transparent Container ID to old resource (existing data path) by the previous event ('Handover Required');

(3) Receiving a 'Handover Request' message from the EPC issued to the TBS and extracting the unaltered unique Source to Target Transparent Container IE;

(4) Retrieving the old resource from the unique Source to Target Transparent Container IE by the new event ('Handover Request');

(5a) If the Source to Target Transparent Container IE can map to old resource, the old resource can be reused and modified;

(5b) If the Source to Target Transparent Container IE cannot map to old resource then create new resource and remove the old one.

The invention provides a methodology implemented in GW nodes to map resources in independent processes belonging to the same UE, such that the new process can access and reuse the resource of the old process to reduce overhead and to improve speed. During such procedure, when relaying the handover related S1AP messages from the SBS for a UE, the GW node registers the temporary ID of the first handover event with a Source to Target Transparent Container IE field value, which can be used to uniquely identify a data path resource of a UE. When the handover related SLAP messages from EPC are relayed to the TBS for that UE, the unaltered Source to Target Transparent Container IE field is used to look up the registered temporary ID to locate the reusable resource. The data plane modifies the old resource instead of deleting the old resource and creating new resource.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of modifying a data path between a user equipment (UE) and a core network node (CNN) in a wireless communication network, the method comprising the steps of:
    at a network gateway node handling both signalling messages and user data for an existing data path between said UE and said CNN via a source base station (SBS), obtaining Information Element (IE) data from a Handover Request message issued by said SBS to a target base station (TBS);
    mapping said IE data to said existing data path; and
    modifying said existing data path based on said mapping to transfer said existing data path from said SBS to said TBS.

2. The method of claim 1, wherein the network gateway node handling both signal messaging and user data for an existing data path comprises a gateway (GW) connecting the SBS and TBS to a Mobility Management Entity (MME) of the core network, said GW being configured to handle user plane data and control plane data.

3. The method of claim 1, wherein, prior to implementing the modifying step, the method includes making a determination of whether or not the existing data path can be transferred from the SBS to the TBS and, if yes, implementing the data path transfer, or, if not, creating a new data path between the UE and the CNN via the TBS.

4. The method of claim 1, wherein said IE data are obtained from a Source to Target Transparent Container IE of said Handover Required message.

5. The method of claim 1, wherein said IE data comprise a Radio Network Temporary Identifier (RNTI) associated with said UE.

6. The method of claim 5, wherein said RNTI comprises a Cell-RNTI (C-RNTI).

7. The method of claim 1, wherein the method includes the steps at the network gateway node of:
    determining if the IE data obtained from the Handover Request message match the IE data mapped to the existing data path and:
        if a match is determined, implementing the data path transfer; or
        if a match is not determined, creating a new data path between the UE and the CNN via the TBS.

8. The method of claim 7, wherein the IE data obtained from the Handover Request message issued to the TBS are obtained from a Source to Target Transparent Container IE included in said Handover Request message.

9. The method of claim 1, wherein the IE data is selected as data which is not altered by other network nodes which forward and/or process the signaling messages.

10. A gateway node for a wireless communication network, said node comprising:
    a non-transitory computer readable medium storing machine executable instructions; and
    a processor connected to the non-transitory computer readable medium configured to execute the machine executable instructions to arrange said node to:
    handle both signalling messages and user data for an existing data path between a user equipment (UE) and a core network node (CNN) via a source base station (SBS);
    obtain Information Element (IE) data from a Handover Request message issued by said SBS to a target base station (TBS);
    map said IE data to said existing data path; and
    subsequently modify said existing data path based on said mapping to transfer said existing data path from said SBS to said TBS.

11. The gateway node of claim 10, wherein the processor arranges the gateway node to, prior to implementing the modifying step, make a determination of whether or not the existing data path can be transferred from the SBS to the TBS and, if yes, transferring said existing data path from the SBS to the TBS, or, if not, creating a new data path between the UE and the CNN via the TBS.

12. The gateway node of claim 10, wherein the processor arranges the gateway node to obtain a Cell-Radio Network Temporary Identifier (C-RNTI) associated with said UE.

13. The gateway node of claim 10, wherein the processor arranges the gateway node to:
    obtain IE data from a Source to Target Transparent Container IE included in the Handover Request message issued to the TBS;

determine if the IE data obtained from the Handover Request message match the IE data mapped to the existing data path and:
if a match is determined, transfer the existing data path transfer from the SBS to the TBS; or
if a match is not determined, create a new data path between the UE and the CNN via the TBS.

14. The gateway node of claim 10, wherein the processor arranges the gateway node to select IE Data which is not altered by other network nodes which forward and/or process the signaling messages.

15. A non-transitory computer readable medium storing machine executable instructions, which, when such instructions are executed by a processor, configure the processor to configure a network gateway node handling both signalling messages and user data for an existing data path between a user equipment (UE) and a core network node (CNN) via a source base station (SBS) to implement the steps of:
obtaining Information Element (IE) data from a Handover Request message issued by said SBS to a target base station (TBS);
mapping said IE data to said existing data path; and
modifying said existing data path based on said mapping to transfer said existing data path from said SBS to said TBS.

16. A method of modifying a data path between a user equipment (UE) and a core network node (CNN) in a wireless communication network, the method comprising the steps of:
at a network node handling both signalling messages and user data for an existing data path between said UE and said CNN, obtaining Information Element (IE) data from a Handover Request message issued by a source base station (SBS) to a target base station (TBS);
determining if the IE data obtained from the Handover Request message match the IE data mapped to the existing data path and:
if a match is determined, implementing the data path transfer by mapping said data to said existing data path and modifying said existing data path based on said mapping to transfer said existing data path from said SBS to said TBS; or
if a match is not determined, creating a new data path between the UE and the CNN via the TBS.

17. A node for a wireless communication network, said node comprising:
a non-transitory computer readable medium storing machine executable instructions; and
a processor connected to the non-transitory computer readable medium configured to execute the machine executable instructions to arrange said node to:
handle both signalling messages and user data for an existing data path between said UE and said CNN;
obtain Information Element (IE) data from a Handover Request message issued by a source base station (SBS) to a target base station (TBS);
determine if the IE data obtained from the Handover Request message match the IE data mapped to the existing data path and:
if a match is determined, implement the data path transfer by mapping said data to said existing data path and modifying said existing data path based on said mapping to transfer said existing data path from said SBS to said TBS; or
if a match is not determined, create a new data path between the UE and the CNN via the TBS.

* * * * *